(12) United States Patent
Reichow et al.

(10) Patent No.: US 9,726,535 B2
(45) Date of Patent: *Aug. 8, 2017

(54) LOAD CELL ASSEMBLIES FOR OFF-CENTER LOADS AND ASSOCIATED METHODS OF USE AND MANUFACTURE

(71) Applicant: Stress-Tek, Inc., Kent, WA (US)

(72) Inventors: Keith Reichow, Kent, WA (US); Bill Zimmerman, Seattle, WA (US)

(73) Assignee: Stress-Tek, Inc., Kent, WA (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/494,489

(22) Filed: Sep. 23, 2014

(65) Prior Publication Data
US 2015/0226599 A1    Aug. 13, 2015

Related U.S. Application Data

(63) Continuation of application No. 13/088,294, filed on Apr. 15, 2011, now Pat. No. 8,841,566.

(60) Provisional application No. 61/324,707, filed on Apr. 15, 2010.

(51) Int. Cl.
| | |
|---|---|
| *G01L 1/04* | (2006.01) |
| *G01G 19/12* | (2006.01) |
| *G01L 1/22* | (2006.01) |
| *G01G 3/14* | (2006.01) |

(52) U.S. Cl.
CPC .............. *G01G 19/12* (2013.01); *G01G 3/14* (2013.01); *G01L 1/04* (2013.01); *Y10T 29/49826* (2015.01)

(58) Field of Classification Search
CPC .... G01G 19/12; G01G 3/14; Y10T 29/49826; G01L 1/04; G01L 1/22
See application file for complete search history.

(56) References Cited

U.S. PATENT DOCUMENTS

| | | | | |
|---|---|---|---|---|
| 3,283,838 | A * | 11/1966 | Fetterman | G01G 19/12 177/1 |
| 3,854,540 | A * | 12/1974 | Holmstrom, Jr. | G01G 3/1404 177/136 |
| 4,042,049 | A * | 8/1977 | Reichow | G01G 3/1406 177/137 |
| 4,125,168 | A * | 11/1978 | Ormond | G01G 3/1402 177/211 |
| 4,581,948 | A * | 4/1986 | Reichow | G01G 21/23 177/211 |
| 4,666,003 | A * | 5/1987 | Reichow | G01G 19/12 177/136 |

(Continued)

*Primary Examiner* — Randy Gibson
(74) *Attorney, Agent, or Firm* — Perkins Coie LLP

(57) ABSTRACT

Embodiments of the present disclosure are directed to load cell assemblies configured for measuring loads or weight associated with a semi-trailer. In one embodiment, a load cell assembly includes a shear plate load cell configured to be coupled between a frame and a support member of the semi-trailer. The shear plate load cell detects or measures the trailer's weight with a sensor positioned on a strain sensing section of a plate. The strain sensing section is positioned at a location offset from the plate's centerline. The shear plate load cell is accordingly configured to provide an ideal moment balance that allows accurate load measurements independent of where the load is applied relative to the load cell or the support member.

20 Claims, 6 Drawing Sheets

(56) References Cited

U.S. PATENT DOCUMENTS

| | | | | |
|---|---|---|---|---|
| 4,823,597 A * | 4/1989 | White | ............... | G01G 17/02 |
| | | | | 177/229 |
| 5,327,791 A * | 7/1994 | Walker | ............... | G01G 19/12 |
| | | | | 177/211 |
| RE35,301 E * | 7/1996 | Reichow | ............... | G01G 19/12 |
| | | | | 177/136 |
| 6,396,003 B1 * | 5/2002 | Friesen | ............... | G01G 19/08 |
| | | | | 177/136 |
| 6,898,989 B2 * | 5/2005 | Norling | ............... | G01L 1/127 |
| | | | | 73/862.632 |
| 7,538,281 B2 * | 5/2009 | Pottebaum | ............... | G01G 19/12 |
| | | | | 177/211 |
| 2011/0209926 A1 * | 9/2011 | Kuhlmann | ............... | G01G 3/1414 |
| | | | | 177/211 |

\* cited by examiner

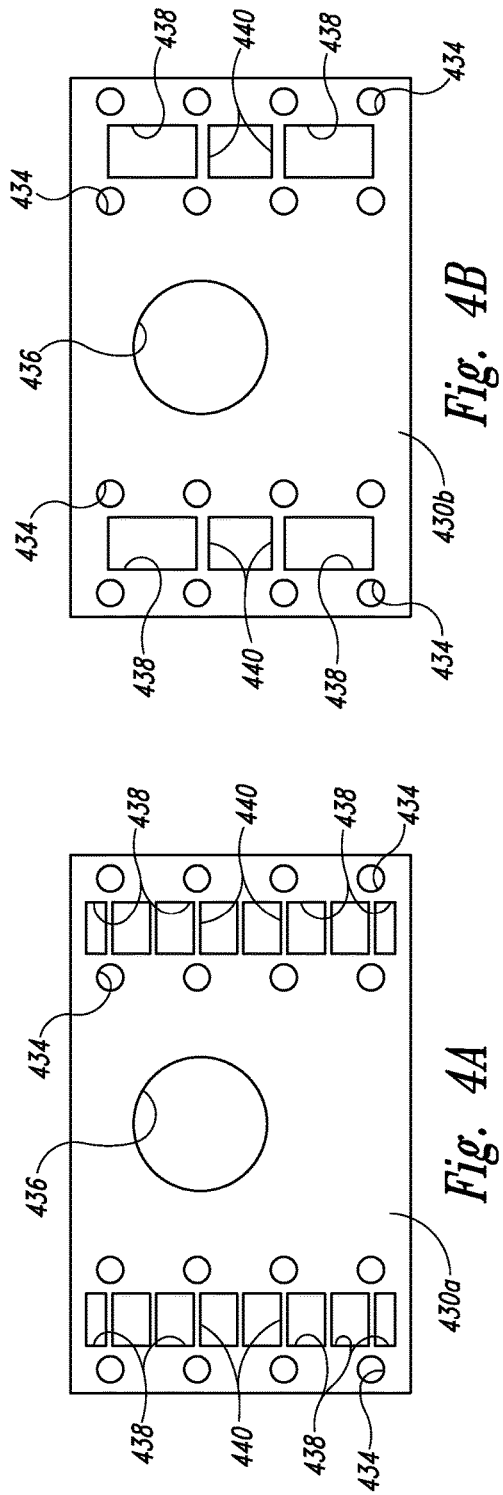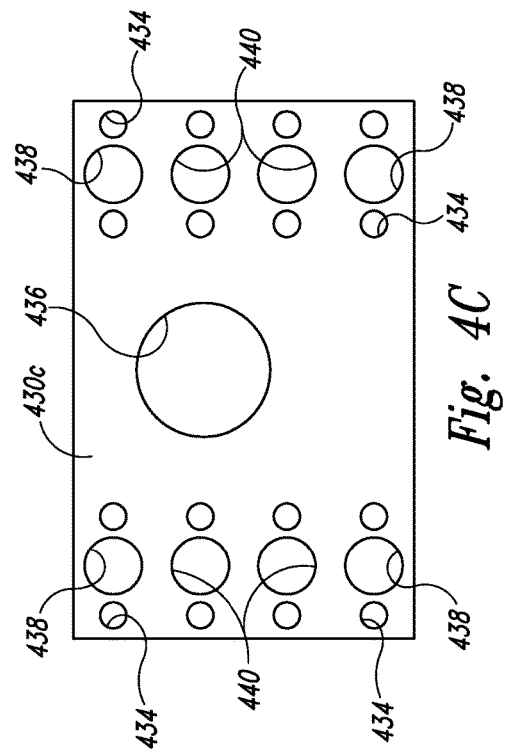

LOAD CELL ASSEMBLIES FOR OFF-CENTER LOADS AND ASSOCIATED METHODS OF USE AND MANUFACTURE

CROSS-REFERENCE TO RELATED APPLICATION(S)

The present application is a continuation of U.S. patent application Ser. No. 13/088,294, filed Apr. 15, 2011 and titled "LOAD CELL ASSEMBLIES FOR OFF-CENTER LOADS AND ASSOCIATED METHODS OF USE AND MANUFACTURE," which claims priority to provisional U.S. Patent Application No. 61/324,707, filed Apr. 15, 2010, and titled "LOAD CELL ASSEMBLIES FOR OFF-CENTER LOADS AND ASSOCIATED METHODS OF USE AND MANUFACTURE," which are both incorporated herein by reference in their entirety.

TECHNICAL FIELD

The present disclosure is directed generally to load cell assemblies, and more specifically, to load cell assemblies for measuring off-center loads associated with semi-trailers.

BACKGROUND OF THE INVENTION

Semi-trailer trucks are frequently used to pull semi-trailers to haul cargo over roads. It is often desirable to know the weight of the cargo that the semi-trailer is hauling. FIG. 1A, for example, is a schematic side view of a first conventional system 10a for measuring the weight of cargo carried by a semi-trailer 12. As shown in FIG. 1A, the first system 10a includes a semi-trailer truck 20 that is coupled to the semi-trailer 12 via a fifth wheel coupling 22. The semi-trailer 12 includes rear suspension 14 (e.g., wheels, shocks, etc.), and the fifth wheel coupling 22 that attaches to the semi-trailer truck 20, generally over the truck's rear suspension 24 (e.g., wheels, shocks, etc.). The first system 10a also includes a rear load sensing assembly 16 positioned on or in the semi-trailer's 12 rear suspension 14, and a front load cell 18 positioned between the semi-trailer 12 and the truck's rear suspension 24. The rear load sensing assembly 16 and the front load cell 18 are designed to detect the weight of the load in the semi-trailer 12 while the semi-trailer 12 is coupled to the truck 20. The rear load sensing assembly 16 and the front load cell 18 can also be coupled to a display 26. The display 26 can be positioned in the truck 20 or at other locations to provide convenient access for a user.

In some instances, it is also desirable to determine the weight of the cargo in the semi-trailer 12 when the semi-trailer 12 is not coupled to the truck 20. FIG. 1B, for example, is a schematic side view of a second conventional system 10b for measuring the weight of the cargo of a semi-trailer 12 that is parked and detached from a corresponding semi-trailer truck. As shown in FIG. 1B, the rear suspension 14 supports the rear portion of the semi-trailer 12 with the corresponding rear load sensing assembly 16 between the rear suspension 14 and the semi-trailer 12. The front portion of the semi-trailer 12, however, is supported by landing gear or struts 28 extending from the front of the semi-trailer 12. The landing gear 28 can extend or pivot relative to the semi-trailer 12 between the extended position shown in FIG. 1B, and a stowed position adjacent to the semi-trailer 12 when the semi-trailer 12 is coupled to a truck. The second system 10b also includes a front load cell 18 positioned beneath the landing gear 28 (i.e., between the landing gear 28 and the ground). In this manner, the rear load sensing assembly 16 and the front load cell 18 are designed to detect the weight of the load in the semi-trailer 12 when the semi-trailer 12 is free standing. The rear load sensing assembly 16 and the front load cell 18 can also be coupled to a display 26.

SUMMARY

Embodiments of the present disclosure are directed to load cell assemblies configured with moment balanced sensing sections for measuring off-center loads from semi-trailer supports or landing gear, and associated methods of use and manufacture. A load cell assembly configured in accordance with one embodiment of the disclosure includes a shear plate load cell coupled to a support member (i.e., landing gear) of a semi-trailer. The shear plate load cell is configured to accurately measure the trailer's weight with a sensor positioned on or near a strain sensing section (i.e., a web) on a plate positioned at a location offset from the plate's centerline. The shear plate load cell is accordingly configured to provide an ideal moment balance that allows accurate load measurements independent of where the load is applied relative to the load cell or the landing gear.

A load cell assembly configured in accordance with another embodiment of the disclosure includes a load cell plate carrying one or more sensors or transducers (e.g., a strain gauge). The individual sensors are positioned on the load cell plate at corresponding strain sensing sections or webs. Each web has a reduced thickness relative to the load cell plate. Each web can also be generally parallel to and spaced apart from a central longitudinal plane of the load cell plate. The load cell assembly can further include one or more strain focus openings extending through the plate positioned proximate to the corresponding webs. The strain focus openings are configured to focus or otherwise control the location of the strain sensed by the load cell assembly. The load cell assembly can further include one or more connectors or wires coupled to corresponding sensors. The wires can at least partially extend through an internal portion of the load cell plate.

A load cell assembly configured in accordance with another embodiment of the disclosure is configured for measuring a load carried by a semi-trailer having a weight bearing support and a frame. The load cell assembly can include a load cell plate configured to be coupled to the semi-trailer between the weight bearing support and the frame. The load cell plate includes a body having a first thickness and a sensing section having a second thickness less than the first thickness. The load cell plate also includes a strain focus opening and an attachment opening each spaced apart from the sensing section and extending through the body. The strain focus opening is configured to direct or focus deformation of the load cell plate at the sensing section. The attachment opening is configured to receive a fastener to couple the load cell plate to the semi-trailer. The load cell assembly further includes a sensor carried by the sensing section that is configured to detect a load related to a weight associated with the semi-trailer.

According to another embodiment of the disclosure, an assembly for determining weight associated with a semi-trailer having a support coupled to a frame and movable between a first position proximate to the frame and a second position extending away from the frame includes a plate configured to be coupled to the semi-trailer between the support and the frame. The plate has a first portion with a first stiffness and a second portion with corresponding integral sensing sections each having a reduced second stiffness. The second portion is configured to at least partially account for deformation of the sensing sections in response to an off-center load relative to the support. The assembly further includes sensors coupled to the corresponding sensing sections. The sensors are configured to detect deformation of the corresponding sensing sections.

In another embodiment of the disclosure, a method of manufacturing a load cell assembly configured to be coupled to a semi-trailer for determining weight associated with the semi-trailer includes forming multiple sensing sections in a load cell plate. The load cell plate is configured to be coupled to the semi-trailer at a location between a support and a frame of the semi-trailer. The load cell plate includes a first portion with a first flexibility and a second portion including the sensing sections. The individual sensing sections each has a second flexibility greater than the first flexibility, and the second portion is configured to at least partially account for deformation of the sensing sections in response to an off-center load relative to the support. The method also includes forming at least one stress opening proximate to at least one of the sensing sections. The stress opening extends through the load cell plate and is configured to at least partially focus deformation of the load cell plate at the corresponding sensing sections. The method further includes attaching sensors to the corresponding sensing sections. The sensors are configured to detect a mechanical deformation of the sensing sections corresponding to the weight associated with the semi-trailer.

In yet another embodiment of the present disclosure, a method of installing a load cell assembly for determining weight associated with a semi-trailer includes attaching a load cell plate to at least one of a frame and a weight bearing support of the semi-trailer. The load cell plate can include a body having a first thickness and a sensing section having a second thickness less than the first thickness. The load cell plate can also include a strain focus opening and an attachment opening each spaced apart from the sensing section and extending through the body. The strain focus opening is configured to direct or focus deformation of the load cell plate at the sensing section. The attachment opening is configured to receive a fastener to couple the load cell plate to the semi-trailer. The load cell plate can also include a sensor that is carried by the sensing section and configured to detect a load related to a weight associated with the semi-trailer.

BRIEF DESCRIPTION OF THE DRAWINGS

FIGS. 4A-4E are a series of front views of load cell plates configured in accordance with further embodiments of the disclosure.

DETAILED DESCRIPTION OF THE INVENTION

Shear plate load cell assemblies and associated methods for using and making such assemblies are described in detail herein in accordance with embodiments of the present disclosure. Certain details are set forth in the following description and Figures to provide a thorough and enabling description of various embodiments of the disclosure. Other details describing well-known structures and components often associated with load cell assemblies and methods of forming such assemblies, however, are not set forth below to avoid unnecessarily obscuring the description of various embodiments of the disclosure.

Many of the details, dimensions, angles, relative sizes of components, and/or other features shown in the Figures are merely illustrative of particular embodiments of the disclosure. Accordingly, other embodiments can have other details, dimensions, angles, sizes, and/or features without departing from the spirit and scope of the present disclosure. Moreover, certain features described with reference to specific embodiments may be combined with other embodiments of the disclosure. In addition, further embodiments of the disclosure may be practiced without several of the details described below, while still other embodiments of the disclosure may be practiced with additional details and/or features.

Figure 1A:
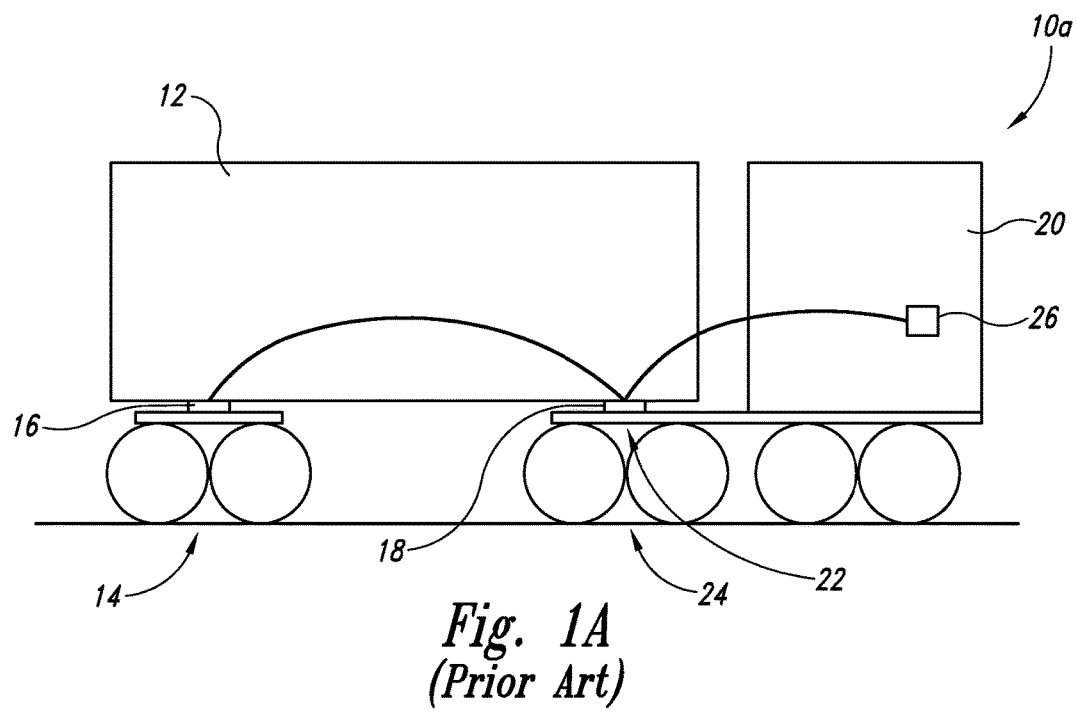
FIGS. 1A and 1B are schematic side views of conventional systems for measuring the weight of a semi-trailer.
Figure 1B:
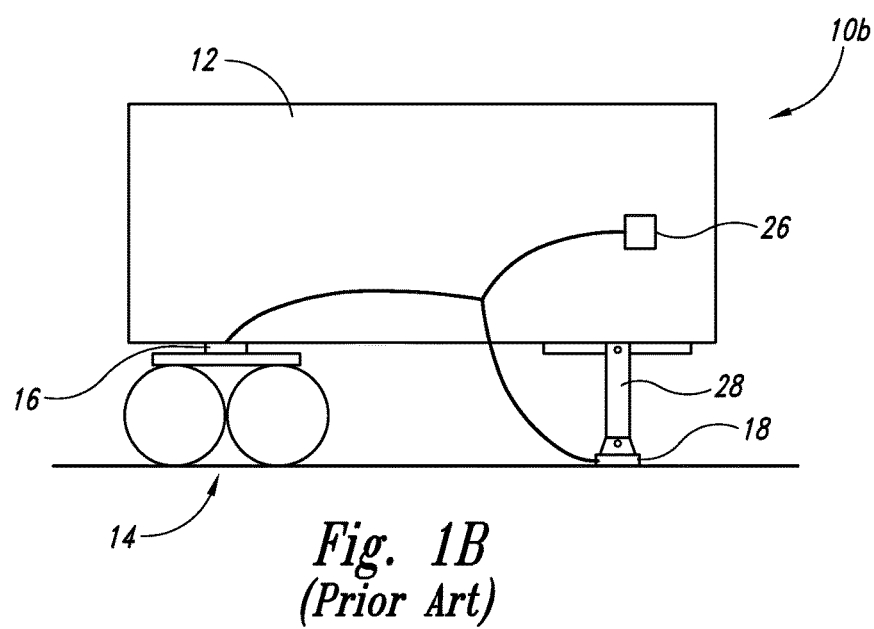
Figure 2A:
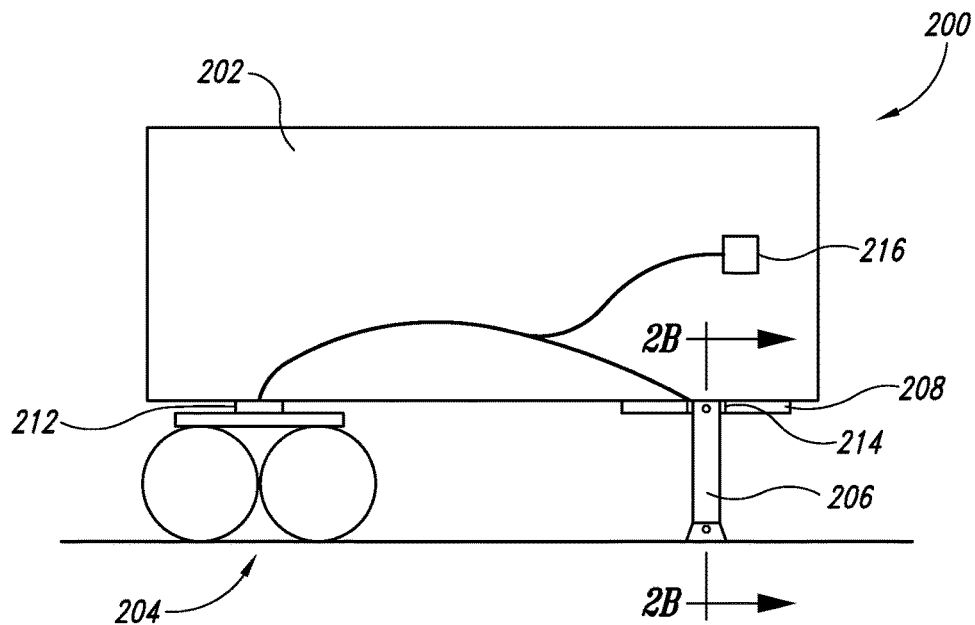
FIG. 2A is a schematic side view of a system configured in accordance with an embodiment of the disclosure.

FIG. 2A is a schematic side view of a system 200 configured in accordance with an embodiment of the disclosure. As described in detail below, the system 200 is configured to measure the weight of cargo carried by a semi-trailer 202 that is decoupled from a semi-truck. More specifically, in the illustrated embodiment, the system 200 includes a first or rear load cell sensing assembly 212 positioned on or in the rear suspension 204 (e.g., wheels, shocks, etc.) supporting the semi-trailer 202. The system 200 also includes a second or front load cell assembly 214 positioned between the semi-trailer 202 and front weight bearing supports or landing gear 206. The landing gear 206 is coupled to the semi-trailer 202 via a frame 208. The landing gear 206 is configured to extend or pivot away relative to the frame 208 between the extended position shown in FIG. 2A, and a stowed position adjacent to the semi-trailer 202 (e.g., when the semi-trailer is coupled to a truck). For example, a crank mechanism (not shown) having a crank arm can extend through at least a portion of the landing gear 206, the second load cell assembly 214, and the frame 208 to move the landing gear 206 relative to the frame 208. Although the embodiment schematically shown in FIG. 2A illustrates a single front load cell assembly 214, one of ordinary skill in the art will appreciate that embodiments configured in accordance with the present disclosure can include a second corresponding load cell assembly at the attachment between the second support leg of the landing gear 206 and the frame 208.

The load cell assemblies 212, 214 of the illustrated embodiment can include transducers or sensors that convert a mechanical force into an electrical signal. As explained below, for example, the load cell assemblies 212, 214 can include one or more strain gauges or other sensors that detect a mechanical deformation or other physical properties of a corresponding shear plate load cell. The detected mechanical deformation can in turn be converted into an electrical output signal to determine the weight of the cargo in the semi-trailer 202.

According to another feature of the illustrated embodiment, the first and second load cell assemblies 212, 214 can be coupled to one another as well as to an output or display 216. The display 216 can include a processor, memory, and any other suitable computing components for receiving, storing, and/or processing data from the first and second load cell assemblies 212, 214. Moreover, these components can be coupled to one another via wired or wireless connections. In certain embodiments, for example, these components can include corresponding transceivers and/or receivers for communicating with one another. In such embodiments, for example, the display 216 can be located remotely from the semi-trailer 202 (i.e., not on the semi-trailer 202). In other embodiments, however, the display 216 can be positioned on the semi-trailer 202.

Figure 2B:
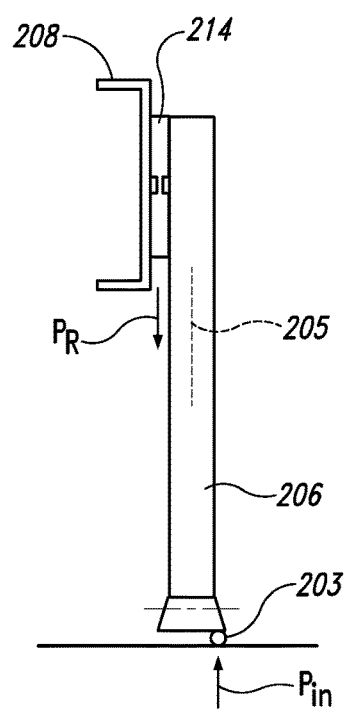
FIG. 2B is a side cross-sectional view taken substantially along line 2B-2B of FIG. 2A.

FIG. 2B is a side cross-sectional view taken substantially along line 2B-2B of FIG. 2A illustrating the position of the load cell assembly 214 between the landing gear 206 and the frame 208. According to one feature of the illustrated embodiment, and as described in detail below, the load cell assembly 214 is configured to accurately detect or measure the value of an off-center load $P_{in}$ applied through the landing gear 206. More specifically, when the landing gear 206 is in the extended position to support the semi-trailer 202, the landing gear 206 may not be positioned on flat ground. As shown in FIG. 2B, for example, the landing gear 206 may be positioned on a small rock 203 or other debris. In these situations, the load $P_{in}$ applied to the landing gear 206 is offset from a centerline 205 of the landing gear 206. This offset load $P_{in}$ creates both bending and twisting loads at the strain sensing section of the load cell assembly 214. According to the embodiments of the present disclosure, however, the load cell assembly 214 is configured to balance or otherwise account for such off-center loads $P_{in}$. More specifically, the load cell assembly 214 is configured such that the location or offset of the load $P_{in}$ applied to the landing gear 206 relative to the sensing components of the load cell assembly 214 is independent from the value of the load $P_{in}$ measured by the load cell assembly 214. In other words, the load cell assembly 214 is configured to accurately determine resultant transverse shearing stresses $P_R$ independently from the offset or location of the load $P_{in}$ relative to the load cell assembly 214 or the landing gear 206. As such, the load cell assembly 214 creates or otherwise accounts for an ideal moment balance of the loads applied to the load cell assembly 214.

Figure 2C:
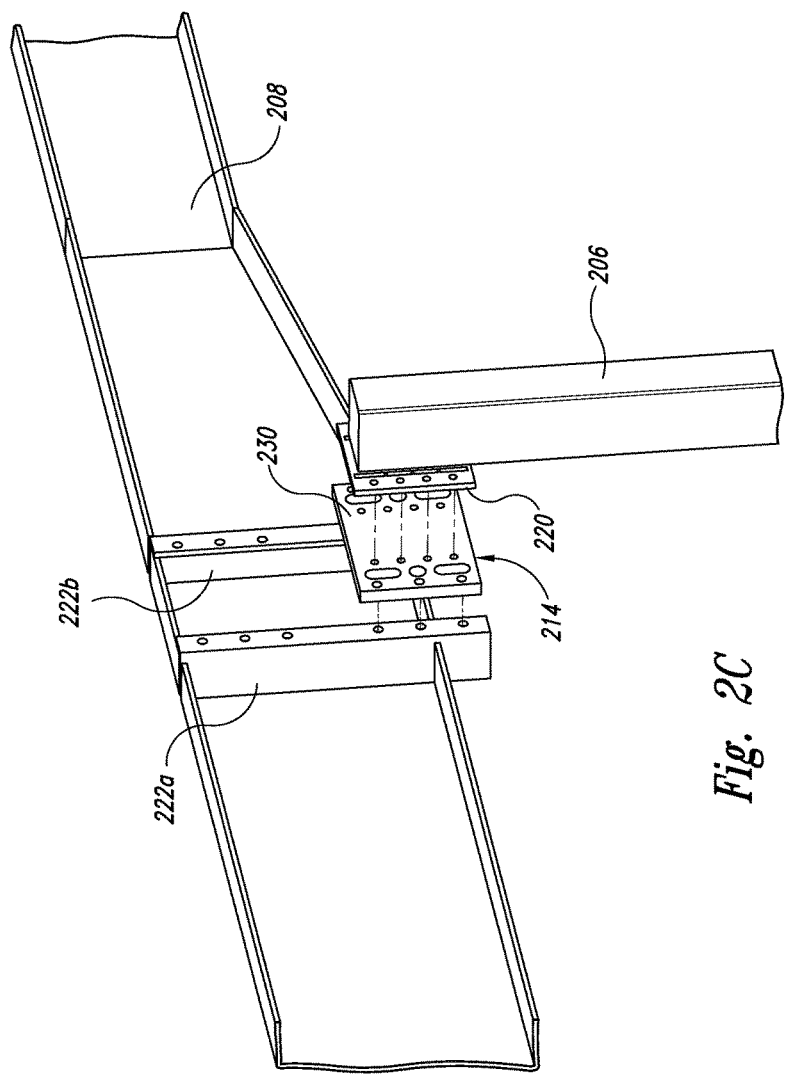
FIG. 2C is an exploded isometric view of a portion of the system of FIG. 2A.

FIG. 2C is an exploded isometric view of a portion of the system 200 of FIG. 2A illustrating additional features of the load cell assembly 214 positioned between the landing gear 206 and the frame 208. In the illustrated embodiment, for example, the load cell assembly 214 includes a shear plate or load cell plate 230. The landing gear 206 includes an attachment plate or flange 220 that is used to secure the landing gear 206 to the load cell plate 230. The load cell plate 230 is secured to attachment rails 222 (identified individually as a first attachment rail 222a and a second attachment rail 222b) of the frame 208 with suitable fasteners (e.g., bolts, screws, rivets, etc.) at a location separate from where the attachment flange 220 is attached to the load cell plate 230. Further details of the load cell plate 230 are described in detail below with reference to FIGS. 3A-4E.

Figure 3A:
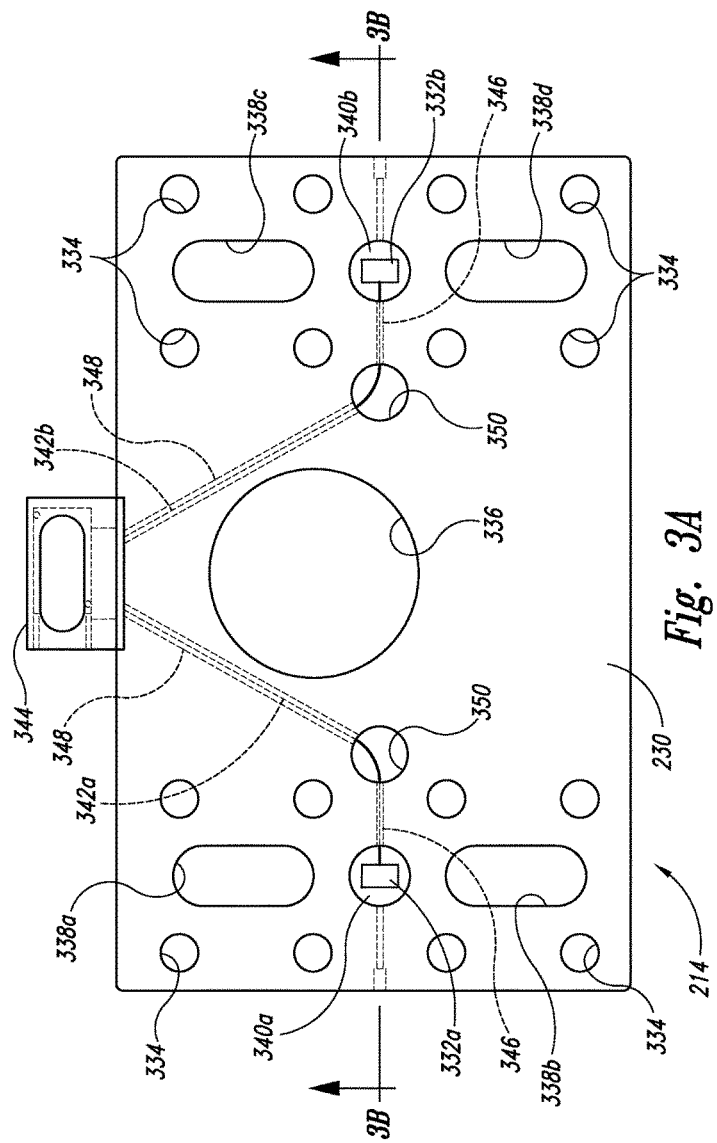
FIG. 3A is a front view of a load cell assembly configured in accordance with an embodiment of the disclosure.

FIG. 3A is a front view of the load cell assembly 214 of FIGS. 2A-2C. In the illustrated embodiment, the load cell assembly 214 includes the load cell plate 230 having a body with sensing sections or web portions 340 (identified individually as a first web portion 340a and a second web portion 340b) that carry corresponding sensors or strain gauges 332 (identified individually as a first strain gauge 332a and a second strain gauge 332b). As described in detail below with reference to FIG. 3B, the web portions 340 are integral segments of the load cell plate 230 that have a reduced thickness and that are generally parallel to and offset from a central plane extending through the load cell plate 230. The reduced thickness of the individual web portions 340 accordingly provides a reduced stiffness or increased flexibility of the individual web portions 340 relative to the body of the plate 230. In the illustrated embodiment the web portions 340 have a generally circular surface area or shape. In other embodiments, however, the web portions 340 can have surface areas with other shapes including, for example, rectilinear, irregular, and/or other suitable shapes.

According to other aspects of the illustrated embodiment, the load cell plate 230 includes multiple openings extending through the load cell plate 230. For example, the load cell plate 230, shown in FIG. 3A, includes multiple attachment openings 334 (e.g., sixteen attachment openings in the illustrated embodiment) configured to receive corresponding fasteners for attaching the load cell plate 230 between the landing gear 206 and the frame 208 (FIG. 2C). The load cell plate 230 also includes a crank arm opening 336 that is configured to receive a crank arm for moving the landing gear 206 between the extended and stowed positions.

The load cell plate 230 also includes multiple deformation or strain focus openings 338 (identified individually as first-fourth strain focus openings 338a-338d) proximate to the web portions 340. The strain focus openings 338 extend through the load cell plate 230 and are configured to focus, direct, control etc. the strain measured by the load cell plate 230 at desired locations on the load cell plate 230. More specifically, the strain focus openings 338 are sized, shaped, and located on the load cell plate 230 to focus the measured strain at the web portions 340 that carry the corresponding strain gauges 332. In the illustrated embodiment, each individual strain focus opening 338 has a generally oblong shape with rounded end portions. Moreover, the strain focus openings 338 are positioned above and below the corresponding web portions 340. In other embodiments, however, the strain focus openings 338 can be positioned at other locations and/or have other shapes including, for example, rectilinear, circular, irregular, etc.

According to yet another feature of the illustrated embodiment, the load cell assembly 214 includes conductors or wires 342 (identified individually as a first wire 342a and a second wire 342b) coupled to the corresponding strain gauges 332. The wires 342 extend through internal portions of the load cell plate 230 from the corresponding strain gauges 332 to an export connector 344, which can in turn be coupled to an output or display. More specifically, the load cell plate 230 includes internally enclosed wire passageways or channels including first internal channel portions 346 extending between the web portions 340 and corresponding wire access or redirection pockets 350. The wire channels also include second internal channel portions 348 extending between the corresponding redirection pockets 350 and the export connector 344. In the illustrated embodiment, the second internal channel portions 348 extend at a non-zero angle relative to the first internal channel portions 346. As such, the first and second internal channel portions 346, 348 and corresponding redirection pockets 350 provide a secure and protected pathway for the wires 342 through the load cell plate 230. After the wires have been positioned and connected, the exposed portions of the wires 342 in the redirection pockets 350 can be covered with an encapsulant or casing to protect these portions of the wires 342 from the environment. The export connector 344 can be configured to be coupled to or otherwise communicate with one or more other outputs or displays.

In certain embodiments, the load cell plate 230 can be made from steel. In other embodiments, however, the load cell plate 230 can be made from other suitable materials including, for example, aluminum, alloys, etc.

Figure 3B:
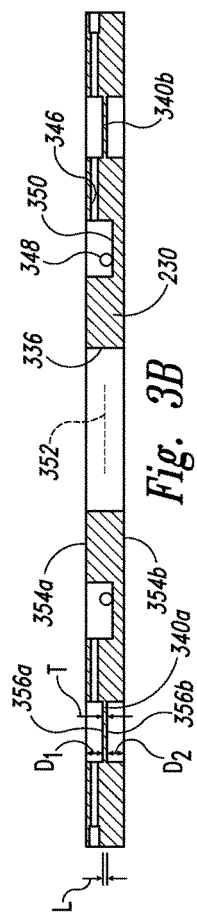
FIG. 3B is a cross-sectional bottom view taken substantially along line 3B-3B of FIG. 3A.

FIG. 3B is a cross-sectional bottom view of the load cell plate 230 taken substantially along line 3B-3B of FIG. 3A. As shown in the illustrated embodiment, the load cell plate 230 includes the crank arm opening 336 extending therethrough, as well as the first channel portions 346 extending between the corresponding web portions 340 and redirection pockets 350. The load cell plate 230 also includes the second channel portions 348 extending from the corresponding redirection pockets 350.

According to another feature of the illustrated embodiment, the load cell plate 230 includes a central longitudinal plane or centerline 352 centered between corresponding first and second exterior surfaces 354a, 354b of the load cell plate 230. As noted above, each web portion 340 is at least partially offset from the load cell plate centerline 352. More specifically, each web portion 340 includes a thickness T defined between a first surface or face 356a opposite a second surface or face 356b. The first web face 356a is spaced apart from the first load cell plate surface 354a by a first depth or distance $D_1$. The second web face 356b is spaced apart from the second load cell surface 354b by a second distance $D_2$ that is less than the first distance $D_1$. Accordingly, a centerline of each web portion 340 is spaced apart from the centerline 352 of the load cell plate 230 by a nonzero distance or length L.

Several features of the load cell plate 230 can be adjusted, optimized, or otherwise altered to configure the load cell plate's shear center to achieve the ideal moment balance of the sensing section of the load cell plate 352 for the purpose of minimizing weight measurement errors. For example, in certain embodiments the following features of the load cell plate 230 can be adjusted, optimized, or otherwise altered to achieve an ideal moment balance for a specific application: (1) the thickness T of the web portions 340; (2) the offset distance or length L of the web portions from the load cell plate centerline 352; (3) the surface area of each of the web faces 356; (4) the size and location of the strain focus openings 338, and/or (5) the overall thickness of the load cell plate 230. In certain embodiments, one of these features can be adjusted independently from the other features to achieve a desired moment balance at the strain gauge carried by the corresponding web portion 340. In other embodiments, however, two, three, four, or all of these features can be adjusted together or independently to achieve the desired moment balance to account for an off-center load. Moreover, in certain embodiments these features can be adjusted to accommodate an off-center load while still achieving an acceptable accuracy in the weight measurement. In one embodiment, for example, these features can be adjusted to achieve a 3% or less error in the weight measurement while accounting for an off-center load. In other embodiments, however, these features can be adjusted to achieve an error of less than or greater than 3%.

FIGS. 4A-4E are a series of front views of first through fifth load cell plates 430a-430e, respectively, configured in accordance with further embodiments of the disclosure. The load cell plates 430 illustrated in FIGS. 4A-4E include several features that are generally similar in structure and function to the corresponding features of the load cell plates described above with reference to FIGS. 2A-3B. For example, the load cell plates 430 illustrated in FIGS. 4A-4E each include a crank arm opening 336 to receive a crank arm, and multiple attachment openings 434 configured to receive corresponding attachment fasteners.

Figure 4D:
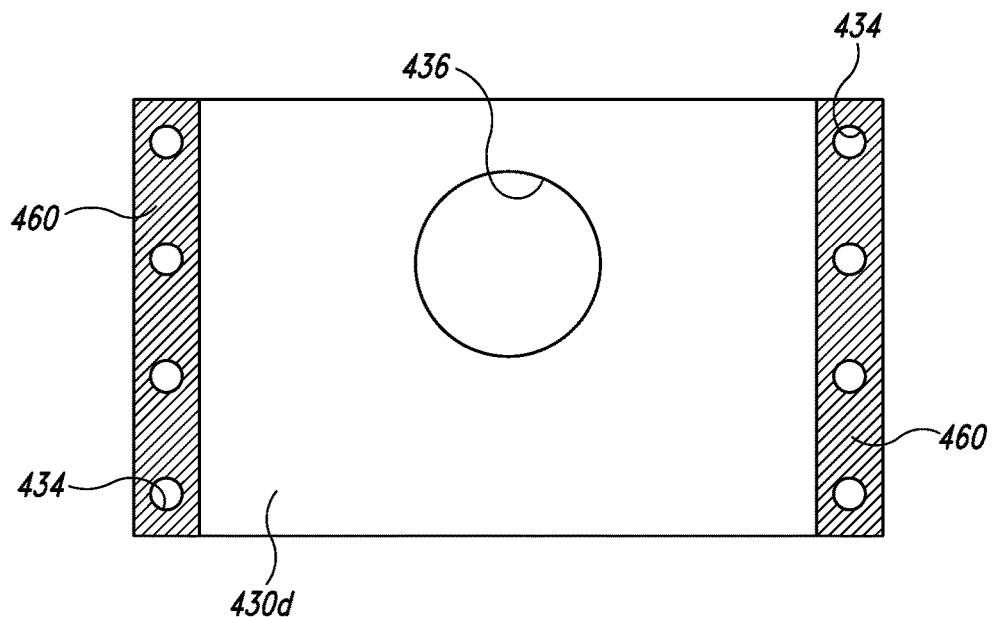

The embodiments illustrated in FIGS. 4A-4E, however, also illustrate various configurations for strain sensing sections as well as strain focus openings in the corresponding load cell plates 430. In FIGS. 4A and 4B, for example, each of the first and second load cell plate 430a, 430b includes multiple strain sensing sections or flexures or web portions 440 between adjacent rectilinear strain focus openings 438 extending through the corresponding load cell plates 430. As such, the individual strain sensing sections 440 span a thickness of the corresponding first and second load cell plates 430a, 430b. Accordingly, the strain sensing sections 440 define at least a portion of the corresponding strain focus openings 438. More specifically, the individual strain sensing sections 440 define at least a portion of a sidewall of the corresponding strain focus openings 438. In the illustrated embodiment, the individual strain sensing sections 440 extend in a direction that is at least generally perpendicular to a central or longitudinal plane of the corresponding load cell plate 430. With multiple strain sensing sections 440 on opposing lateral sides of the load cell plate 430, the strain sensing sections 440 form moment balance features that can reduce weight balance errors by minimizing the effect of off-center loading on semi-trailer supports or landing gear.

Although the strain focusing openings 438 have a generally rectilinear shape in the illustrated embodiment, in other embodiments the strain focus openings 438 can have other suitable shapes. For example, in the embodiment illustrated in FIG. 4C the third load cell plate 430c includes strain sensing sections 440 defining at least a portion of a sidewall of corresponding generally circular strain focus openings 434.

In the embodiments illustrated in FIGS. 4A-4C, the strain sensing sections 440 carry corresponding sensors that convert a mechanical force into an electrical signal. For example, in one embodiment the sensors can be strain gauges that detect a bending deflection or deformation of the corresponding strain sensing sections 440 across the thickness of the plate 430. The detected mechanical deformation can in turn be converted into an electrical output signal to determine the weight of the cargo associated with the semi-trailer. In still further embodiments, however, these sensors as well as the sensors described above with reference to FIGS. 2A-3B can include optical, magnetic, capacitive, and/or angular sensors that are suitable for detecting one or more properties (e.g., mechanical deformation or deflection) to correlate the detected deformation to the weight associated with the corresponding semi-trailer.

Figure 4E:
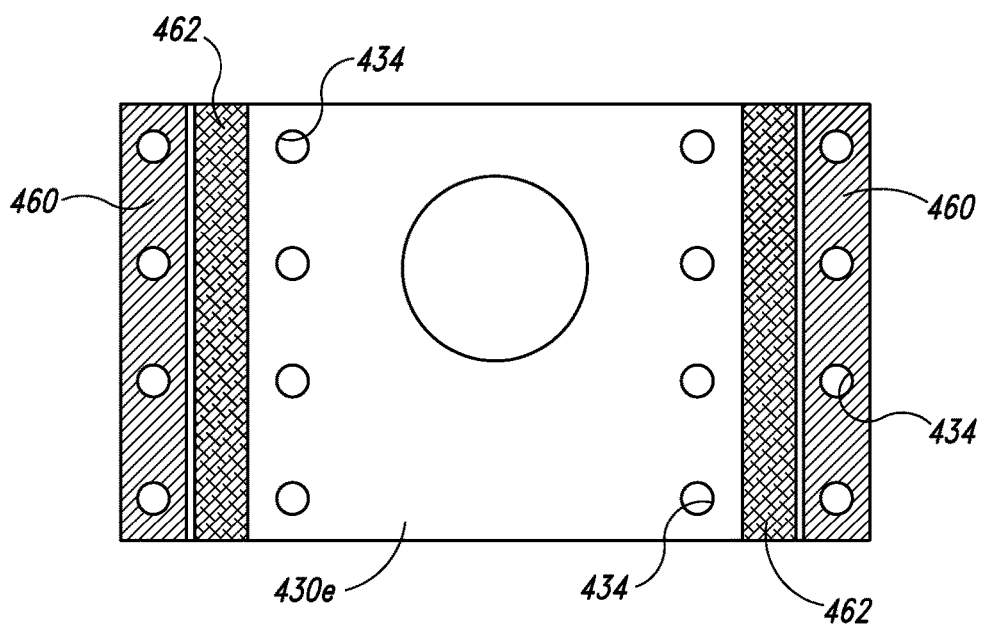

In the embodiments illustrated in FIGS. 4D and 4E, the load cell plates 430 have specific mounting zones for corresponding strain sensors or gauges, as well as for mounting the plates 430 to the landing gear and semi-trailer frames. In FIG. 4D, for example, the fourth load cell plate 430d includes an attachment zone 460 illustrated by the cross-hatched peripheral side portions of the fourth load cell plate 430d. The attachment zone 460 includes one or more attachment openings 434 configured to receive suitable fasteners to couple the fourth load cell plate 430d to a corresponding semi-trailer frame 208. In FIG. 4E, however, the fifth load cell plate 430e includes a sensing zone 462 spaced laterally inwardly from the attachment zone 460. The sensing zone 462 is specifically designated as an area of the load cell plate 430e that is configured to encompass one or more strain sensing sections, receive corresponding sensors, and/or encompass strain focus openings.

The embodiments of the present disclosure accordingly provide the benefit of accurately measuring an off-center load of semi-trailer landing gear no matter where the load is placed with respect to the load cell. From the foregoing, it will be appreciated that specific embodiments of the disclosure have been described herein in detail for purposes of illustration, but that various modifications may be made without deviating from the spirit and scope of the disclosure. Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A load cell assembly for measuring a load carried by a vehicle having a weight bearing support, the load cell assembly comprising:
    a load cell plate configured to be coupled to the weight bearing support of the vehicle, the load cell plate comprising—
        a body having a first thickness and a central longitudinal plane;
        a sensing section having a second thickness less than the first thickness, wherein the sensing section is generally parallel to and offset from the central longitudinal plane;
        a strain focus opening spaced apart from the sensing section; and
        an attachment opening spaced apart from the sensing section, wherein the attachment opening extends through the body and is configured to receive a fastener to couple the load cell plate to the vehicle; and
    a sensor carried by the sensing section and configured to detect a load related to a weight associated with the vehicle.

2. The load cell assembly of claim 1 wherein the sensing section is a moment balance feature configured to at least partially account for deformation of the sensing section in response to an off-center load relative to the weight bearing support.

3. The load cell assembly of claim 1 wherein:
    the body has a first body side opposite a second body side, wherein the first body side is configured to be coupled to the weight bearing support and the second body side is configured to be coupled to a frame of the vehicle; and
    the sensing section further comprises a first web face opposite a second web face, wherein the first web face is recessed from the first body side by a first distance and the second web face is recessed from the second body side by a second distance that is different than the first distance.

4. The load cell assembly of claim 1 wherein the sensing section is a first sensing section at a first portion of the body and the sensor is a first sensor, and wherein the load cell assembly further comprises:
    a second sensing section at a second portion of the body spaced apart from the first portion; and
    a second sensor carried by the second sensing section and configured to detect the load related to the weight associated with the vehicle.

5. The load cell assembly of claim 1 wherein the strain focus opening is a first strain focus opening, and wherein the load cell plate further comprises a second strain focus opening spaced apart from the sensing section, wherein the first and second strain focus openings are disposed on generally opposite sides of the sensing section.

6. The load cell assembly of claim 1, further comprising a conductor coupled to the sensor, wherein the conductor extends through an internal portion of the load cell plate.

7. The load cell assembly of claim 6 wherein the load cell plate further comprises:
    a first internal passage portion extending through a first section of the load cell plate; and
    a second internal passage portion extending through a second section of the load cell plate at a non-zero angle relative to the first internal passage portion, and wherein the conductor extends through each of the first and second internal passage sections.

8. The load cell assembly of claim 1 wherein the sensing section has a generally circular shape.

9. The load cell assembly of claim 1 wherein the strain focus opening has a generally oblong shape with rounded end portions.

10. The load cell assembly of claim 1 wherein the sensor is a strain gauge that is configured to detect a mechanical deformation of the sensing section corresponding to the weight associated with the vehicle.

11. The load cell assembly of claim 1 wherein the weight bearing support is movably coupled to the frame and configured to move between a stowed position adjacent to the frame and an extended position away from the frame.

12. The load cell assembly of claim 1 wherein the sensing section has an increased flexibility relative to the body.

13. An assembly for determining weight associated with a vehicle having a support coupled to a frame and movable between a first position proximate to the frame and a second position extending away from the frame, the system comprising:
    a plate configured to be coupled to the vehicle between the support and the frame, the plate having a first portion with a first stiffness and a second portion with corresponding integral sensing sections each having a reduced second stiffness, wherein the second portion is configured to at least partially account for deformation of the sensing sections in response to an off-center load relative to the support; and
    sensors coupled to the corresponding sensing sections, wherein the sensors are configured to detect deformation of the corresponding sensing sections.

14. The assembly of claim 13 wherein the first portion of the plate has a first thickness and the individual sensing sections each has a second thickness less than the first thickness.

15. The assembly of claim 13 wherein the second portion comprises one or more deformation openings proximate to the sensing sections, wherein the one or more deformation openings are configured to at least partially focus deformation of the plate at the sensing sections.

16. The assembly of claim 15 wherein the first portion further comprises one or more attachment openings configured to receive one or more fasteners to couple the plate to the vehicle.

17. The assembly of claim 13 wherein the plate has a central longitudinal plane and the individual sensing sections are generally parallel with the central longitudinal plane.

18. The assembly of claim 17 wherein:
    the plate includes a first side opposite a second side; and
    the individual sensing sections include a first surface spaced apart from the first side of the plate by a first distance and a second surface spaced apart from the second side of the plate by a second distance that is less than the first distance.

19. The assembly of claim 13 wherein the plate has a central longitudinal plane and the individual sensing sections are generally perpendicular to the central longitudinal plane.

20. The assembly of claim 19 wherein the individual sensing sections comprise a surface of a corresponding opening extending through the plate.

\* \* \* \* \*